July 8, 1969  B. E. SANGUINETTI  3,454,314

RESILIENT PRESSURE ASSEMBLED BEARING

Filed June 28, 1967

United States Patent Office 3,454,314
Patented July 8, 1969

3,454,314
RESILIENT PRESSURE ASSEMBLED BEARING
Bradley E. Sanguinetti, Northvale, N.J., assignor to General Bearing Co., Inc., West Nyack, N.Y.
Filed June 28, 1967, Ser. No. 649,730
Int. Cl. F16c 33/00
U.S. Cl. 308—191                    1 Claim

ABSTRACT OF THE DISCLOSURE

An assembled ball bearing, having an inner race, an outer race and a plurality of spherical bearing elements, the outer race being formed entirely of resilient synthetic resinous material and including means for retaining the device in assembled condition after pressure assembly.

---

This invention relates generally to the field of low cost ball bearings including an inner race element, an outer race element and bearing members disposed between said race element which may be manufactured at sufficiently low cost to warrant installation in locations which otherwise would permit of sliding contact.

It is among the principal objects of the present invention to provide an improved assembled bearing in which the outer race element may be of material having a degree of resiliency sufficient to permit pressure assembly of the device as a single operation.

Another object of the invention lies in the provision of an improved assembled ball bearing which will function satisfactorily although manufactured with very wide manufacturing tolerances.

A further object of the invention lies in the provision of an assembled ball bearing which may be conveniently integrated using assembly line techniques by those possessed of only ordinary skill.

A further object of the invention lies in the provision of an improved assembled ball bearing in which the cost of fabrication may be of a very low order, thereby permitting consequent wide sale, distribution and use.

A feature of the invention lies in the provision of a deformable septum on one race element which selectively interconnects with corresponding means on an inner race element to maintain the device in assembled condition.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Figure 1:
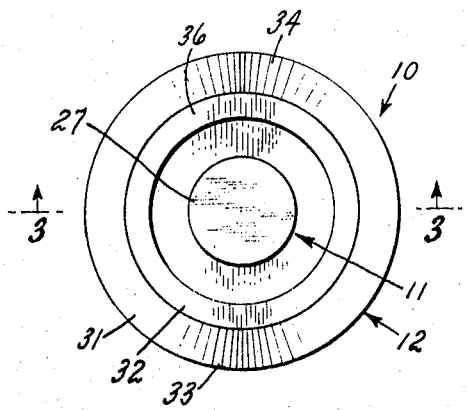
FIGURE 1 is a side elevational view of an embodiment of the invention.
Figure 2:
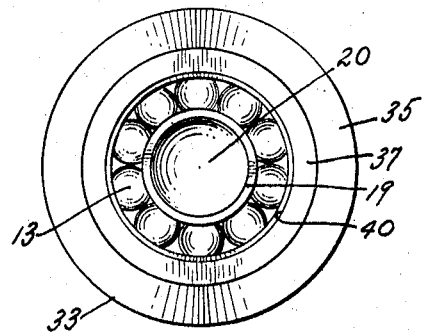
FIGURE 2 is a side elevational view thereof, showing the side opposite that seen in FIGURE 1.

In accordance with the invention, the device, generally indicated by reference character 10, comprises broadly: an inner race element 11, an outer race element 12, and a plurality of spherical bearings 13.

The inner race element 12 may be formed as a die casting, or screw machine part, and includes a deformable end member 16, a ball engaging member 17 and an outer race element engaging member 18. The deformable end member 16 is bounded by a cylindrical surface 19 and a dished end surface 20 to permit staking or enlargement, whereby the bearing may be maintained within an opening in a sheet metal part (not shown). The ball engaging member 17 includes an outer surface of revolution 22 extending between points 23 and 24. The outer race engaging member 18 includes a cylindrical flange 25, a recessed surface 26 and chamfered flange 27 which define a groove 28 in which a portion of the outer race element 12 is engaged.

The outer race element 12 is preferably formed as a molding of synthetic resinous material, such as nylon, and includes a circular body 31, the inner periphery of which is interconnected by a planar web-like septum 32.

Figure 3:
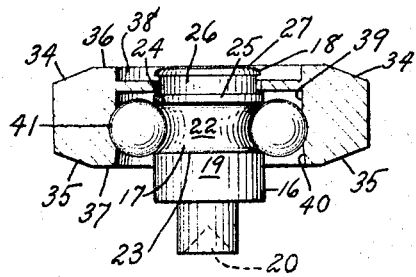
FIGURE 3 is a longitudinal central sectional view as seen from the plane 3—3 in FIGURE 1.

The body 31 is bounded by an outer peripheral surface 33, angularly disposed surfaces 34 and 35, planar surfaces 36 and 37, and inner peripheral surfaces 38 and 39. A portion of the surface 39 is tapered as at 40, to facilitate assembly of the device, as will more fully appear hereinafter. A recess 41 accommodates the balls 13, as best seen in FIGURE 3.

The septum 32 is bounded by first and second planar surfaces 43 and 44, respectively, which define a central opening 45, the diameter of which is greater than that of the recessed surface 26, but less than that of the flange 27.

Assembly of the device is facilitated by the use of a lower fixture 48 having a bottom wall 49 and a cylindrical side wall 50. The wall 50 defines a tapered upper edge 51 leading to a recess 52 in which the inner race element 11 is positioned. The fixture 48, being suitably jigged (by means not shown) may then be loaded with balls 13 which are maintained in position by the edge 51.

Figure 4:
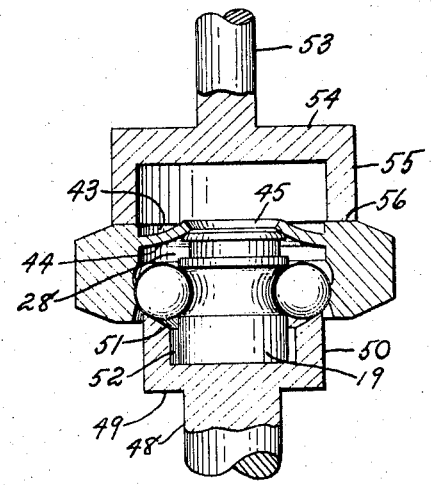
FIGURE 4 is a fragmentary longitudinal central sectional view showing assembly of the device into completed form.

Next, the outer race element 12 is positioned as shown in FIGURE 4, and pressure is applied to the planar surface 36 by means of an upper fixture 53 which includes a planar wall 54 and a cylindrical side wall 55 presenting an edge 56 there against. With the application of pressure upon the fixtures 48 and 53 in opposing directions, the outer race element 12 is distorted such that the body 31 permits passage of the balls 13 until they snap into position within the recess groove 41. Simultaneous with this action, the opening 45 is distorted to pass the chamfered flange 27 and snap into the recess 28, thereby retaining the device in assembled condition as seen in FIGURE 3.

I wish it to be understood that we do not consider the invention limited to the precise details of strucure shown and set forth in this specification, for obvious modifications will occur to those skilled in the art to which the invention pertains.

I claim:

1. In a pressure assembled ball bearing, including an inner race element, an outer race element, and a plurality of spherical balls disposed between said race elements, the improvement comprising: said inner race element being formed of mechanically distortable material capable of retaining an imparted shape, and having a disstortable portion, a coaxially disposed ball engaging portion, and a coaxially disposed groove forming portion; said outer race element being formed of a synthetic resinous material having a substantial degree of resiliency and including a circular body defining an outer raceway, a peripheral load bearing surface, and a planar septum defining a centrally disposed orifice of diameter substantially corresponding to that of said groove forming portion; said ball bearing being maintained in assembled condition by engagement of said groove forming portion with said orifice, and as a result of radially directed distortion of said circular body to permit passage of said spherical bearings in an axial direction into said outer raceway.

References Cited

UNITED STATES PATENTS

| | | | |
|---|---|---|---|
| 2,913,284 | 11/1959 | Zankl | 308—15 |
| 3,097,898 | 7/1963 | Ferdig | 308—190 |
| 3,113,814 | 12/1963 | Ogura | 308—187.2 |
| 3,224,821 | 12/1965 | Barr | 308—198 |

MARTIN P. SCHWADRON, *Primary Examiner.*

F. SUSKO, *Assistant Examiner.*